United States Patent [19]

Harrigan

[11] 4,104,671

[45] Aug. 1, 1978

[54] PHOTOGRAPHIC PRINTING AND DEVELOPING TRAY

[76] Inventor: Roy M. Harrigan, Bromley Mountain Rd., Manchester, Vt. 05254

[21] Appl. No.: 649,454

[22] Filed: Jan. 15, 1976

[51] Int. Cl.[2] ....................... G03D 13/02; G03B 27/32

[52] U.S. Cl. .................................... 354/337; 354/297; 354/331; 355/27

[58] Field of Search ............................ 355/27, 72, 77; 354/297, 320, 324, 331, 332, 333, 334, 335, 336, 337, 338; 220/13; 134/92, 192; 211/47, 126, 127, 128

[56] References Cited

U.S. PATENT DOCUMENTS

| | | | |
|---|---|---|---|
| 1,444,435 | 2/1923 | Steinberger | 354/337 |
| 2,562,588 | 7/1951 | Traiber | 354/324 X |
| 3,067,667 | 12/1962 | Krehbiel | 354/334 |
| 3,115,815 | 12/1963 | Friedel | 354/5 |
| 3,388,652 | 6/1968 | Parrent | 355/27 X |
| 3,587,429 | 6/1971 | Morse | 354/336 X |
| 3,641,912 | 2/1972 | Mills et al. | 354/331 X |
| 3,783,756 | 1/1974 | Friedel | 355/27 X |
| 3,888,584 | 6/1975 | Smith | 355/72 X |

FOREIGN PATENT DOCUMENTS

| | | | |
|---|---|---|---|
| 2,264,145 | 7/1973 | Fed. Rep. of Germany | 354/337 |

*Primary Examiner*—Fred L. Braun
*Attorney, Agent, or Firm*—Robert S. Smith

[57] ABSTRACT

The developing solution is carried in a special print tray which holds the print paper on a first planar surface which is above the surface of the developing fluid when the cover is open. When the cover is closed a displacement member forces fluid over the print paper and against a planar transparent second surface which is parallel and spaced from the first surface.

5 Claims, 2 Drawing Figures

PHOTOGRAPHIC PRINTING AND DEVELOPING TRAY

BACKGROUND OF THE INVENTION

The method and apparatus in accordance with the invention pertains to photography and particularly to apparatus and methods for producing an image on a piece of print paper with an enlarger. In the prior art method and apparatus an image is produced by an enlarger which is projected on a piece of print paper for a given interval of time and thereafter the paper is put in a developing solution for some finite time. It is inherently necessary to use a trial and error process of varying the exposure time of the print paper and varying the time of deposition of the print paper in a developing solution to produce the desired photographic image fixed on the print paper. Because of the wide variation necessary in times required for different subject matter, film etc. it is difficult to anticipate what is the necessary finite time. The trial and error process is even more pronounced when certain techniques known as dodging, burning in and solarization are employed.

Conventional apparatus where the print paper is merely deposited below the surface of a developing solution in a conventional tray does not permit simultaneous exposure and development because the immersion of the print paper in the developing solution would produce ripples. These ripples will continue for an interval longer than the maximum time which the print may be left in the developing solution. It will be understood that if an attempt is made to produce an image while the ripples are present, there will be serious distortion produced. It will also be understood that if the print paper is left in the developing solution longer than the maximum time (which ordinarily is about three minutes) the print paper will be over developed and will be useless. Even if the ripples were to continue for only a minute instead of for three minutes, it would substantially reduce the latitude which the operator would have in producing the desired image on the print paper.

It is an object of the invention to provide apparatus and a method which will allow concurrent projection of an image from an enlarger on a piece of print paper while it is immersed in a developing solution so that a substantial part of the trial and error approach is eliminated.

It is another object of the invention to provide a method and apparatus which will avoid the formation of ripples directly above the print paper.

It is another object of the invention to provide a method and apparatus which will facilitate the use of techniques known as dodging, burning in and solarization by making it possible for the operator to see the image being formed on the printing paper contemporaneously with the projection thereon by the enlarger so that the effects of exposure may be observed and corrected during the development process so that artistic control may be provided over the printing of photographs.

SUMMARY OF THE INVENTION

In accordance with one form of the invention a method is provided for printing and developing an image on a print paper which includes providing a first generally planar surface for holding print paper. A piece of print paper is positioned on the first generally planar surface and a second generally planar transparent surface is disposed in spaced parallel relationship to the first generally planar surface. A quantity of developing fluid is forced intermediate the first and second generally planar surface and an image is projected onto the print paper. The method may include a step of comparing the image forming on the print paper to a standard to evaluate the ultimate product.

The apparatus in accordance with one form of the invention includes a tray having a lower member having a generally horizontal generally planar first member adjacent to a reservoir section at a lower elevation. A cover is positionable with a generally planar transparent surface disposed in generally parallel relationship to the first generally planar member and with a depending displacement member extending into the reservoir section.

BRIEF DESCRIPTION OF DRAWINGS

The invention will be better understood by reference to the accompanying drawing in which.

DESCRIPTION OF THE PREFERRED EMBODIMENT

Figure 1:
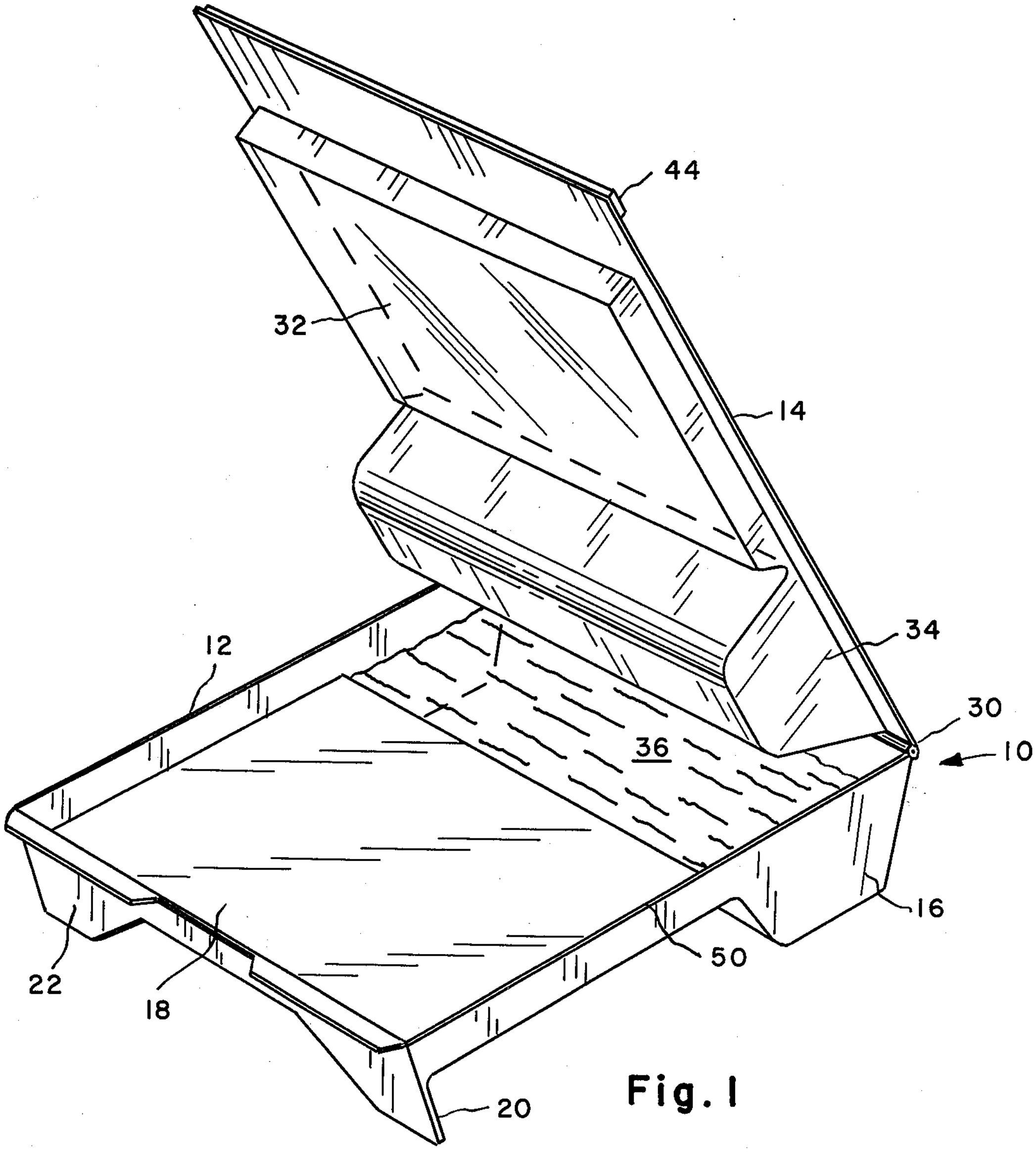
FIG. 1 is an isometric view of a developing tray in accordance with one form of the invention.
Figure 2:
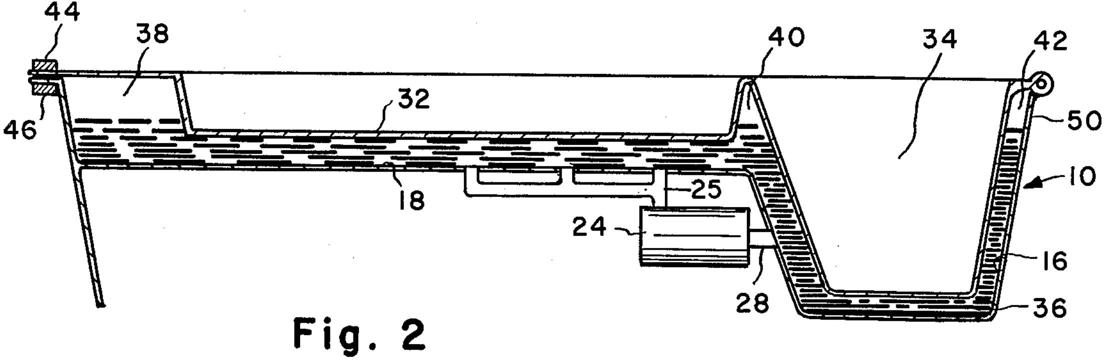
FIG. 2 is a sectional view of the apparatus shown in FIG. 1 with the cover closed and taken along a plane extending through a vertical plane parallel to the side of the tray.

Referring now to FIGS. 1 and 2 there is shown a tray 10 which comprises a lower section 12 and a cover 14. The lower section 12 includes a reservoir chamber 16 which is disposed at a lower level than a first generally planar section 18 which is provided for holding a piece of print paper. Legs 20 and 22 depend from one end to maintain the first generally planar surface 18 in generally horizontal relationship to the surface on which the tray rests. In one form of the invention a pump 24 having an inlet connection 25 to the first generally planar surface 18 and an outlet connection 28 connected to the reservoir chamber 16 is provided. A suitable diffuser (not shown) is provided to avoid turbulent flow. The diffuser may comprise porous surface or a plurality of holes in the first surface 18. The embodiments which do include the pump 24 have the advantage of holding the associated print paper onto the generally planar surface 18 by the action of the suction side of the pump 24. A flange 50 extends circumferentially around the lower member to a height greater than the height of a second generally planar member 32 to be described hereafter.

Secured by a hinge 30 to the lower portion 12 is cover 14 which includes a transparent second generally planar surface 32 which is disposed (when the cover is closed) in spaced parallel relationship to the first generally planar surface 18. A displacement member depends from one section of the cover 14 and extends into the reservoir chamber 16. It will be understood that it is desirable for the displacement member 34 and the reservoir chamber to be sized so that (1) when the cover 14 is open the first generally planar surface 18 is not covered with developing fluid 36 which is initially disposed in the reservoir chamber 16 and (2) when the cover is closed as shown in FIG. 2 the fluid 36 does completely occupy the space intermediate the first generally planar surface 18 and the second generally planar surface 32. A mark (not shown) may be provided on the side of the reservoir chamber 16 to identify the nominal recommended filling level with the cover open. The cover 14 is contoured to provide regions 38, 40, 42 which will allow some tolerence on the volume of fluid which is initially disposed in the reservoir chamber 16. It will be seen that it is essential that the upper surface of the developing fluid be higher than the second generally planar surface 32 to avoid the possibility of any ripples being disposed intermediate first and second generally planar surfaces 18, 32. The spaces or regions 38, 40, 42 allow the fluid to rise so that it is positively above the level of the second generally planar surface 32. The strip magnets 44, 46 extend along the extremitites of the cover 14 and lower member 12 in one form of the invention to insure positive closure of the cover. Magnets (not shown) may also be used to secure the print paper on the second generally planar surface 18. In other forms of the invention depending legs (not shown) which may be resilient may be provided which extend from peripheral portions of the second generally planar surface 32 to firmly hold print paper (not shown) on the first generally planar surface 18. Such legs will avoid any tendency of the print paper to curl which would be detrimental to the quality of the finished product.

It is fundamental to the invention that if the first exposure of the print paper is a slight underexposure corrections may be added after observation of the forming image by addition of further short or low intensity exposures including further exposures of only part of the print (Burning in or dodging). It is essential to such a method that the print paper be kept in register with intermittent enlarger images while the developing process is observed and controlled. It will be understood that proper developing time for a given paper, solution and temperature is usually a fixed finite time interval and control of the image on the paper is primarily by variation of exposure to the image projected by the enlarger.

In operation the print paper is deposited on the first generally planar member 18 and the developing solution is placed in the reservoir chamber 16. Cover 14 is closed to displace developing solution intermediate first and second generally planar surfaces 18, 32. An enlarger (not shown) is positioned above the transparent second generally planar member 32 and oriented to project an image through that second member 32 onto the print member disposed on first planar member 18. The image will of course pass through the developing solution 36 which is disposed intermediate first and second planar members 18, 32. The operator may use a conventional dark room light to observe an image being formed on the print paper. It will be understood that there is a time lag of approximately 20 seconds between exposure of print paper to an image and the appearance of the resulting developing image. The operator will however, in accordance with one method of the invention be provided with standards which will show by examples the image condition which correlates with a satisfactory final product. Those skilled in the art will recognize that the minor correlation necessary between the image which is apparent at any given time and the image which will be on the print paper after some short time interval is quite minor compared to the trial and error method inherent in the prior art system with varying development times and varying exposure times.

Having thus described my invention I claim:

1. A tray for photographic printing and developing which comprises:

a lower member having a generally planar horizontal first surface and a reservoir section disposed with the bottom thereof at a lower elevation than said planar horizontal first surface; and a cover cooperating with said lower member and having a transparent generally planar second surface disposed in generally parallel, spaced, overlapping relationship to said first generally planar surface when said cover is positioned on said lower member, said cover further including a depending displacement member extending into said reservoir section when said cover is positioned on said lower section to displace liquid located therein to a position intermediate said first and second generally planar surfaces, said displacement member being withdrawn from said reservoir section when said cover is moved away from said lower member to allow liquid intermediate said first and second surfaces to flow into said reservoir section.

2. The apparatus as described in claim 1 further including an upstanding flange extending about said first generally planar surface and said reservoir section to a height above said second generally planar surface when said cover is installed.

3. The apparatus as described in claim 2 wherein said cover is hinged to said lower member.

4. The apparatus as described in claim 2 further including a magnetic latch for holding said cover in place.

5. The apparatus as described in claim 2 wherein said first generally planar surface includes a region which when cooperating with a piece of print paper is covered by the associated print paper, said region having a plurality of holes extending through said first generally planar surface, said apparatus further includes a pump having an inlet and an outlet, said inlet being connected to said region and said outlet side of said pump being connected to said reservoir section.

* * * * *